United States Patent [19]

Sahashi et al.

[11] Patent Number: 5,070,593
[45] Date of Patent: Dec. 10, 1991

[54] PUNCH PRESS

[75] Inventors: Nobuo Sahashi, Inuyama; Hiroichi Sakamoto, Kagamihara, both of Japan

[73] Assignee: Murata Kikai Kabushiki Kaisha, Kyoto, Japan

[21] Appl. No.: 321,523

[22] Filed: Mar. 8, 1989

[30] Foreign Application Priority Data

Mar. 9, 1988 [JP] Japan .................. 63-55437

[51] Int. Cl.⁵ .......................................... B23Q 3/155
[52] U.S. Cl. ........................................ 29/568; 72/446
[58] Field of Search .................... 29/568; 72/446, 448; 83/463, 464, 559, 563; 414/744.8, 744.6, 751, 753, 750

[56] References Cited

U.S. PATENT DOCUMENTS

| | | | |
|---|---|---|---|
| 3,458,924 | 8/1969 | Oslebo et al. | 29/568 |
| 3,546,774 | 12/1970 | Stoferle et al. | 29/568 |
| 3,816,904 | 6/1974 | Herb | 72/446 X |
| 4,109,188 | 8/1978 | Shima et al. | 29/568 |
| 4,426,763 | 1/1984 | Hornok et al. | 29/568 |
| 4,901,427 | 2/1990 | Sakamoto et al. | 72/446 X |

FOREIGN PATENT DOCUMENTS

| | | | |
|---|---|---|---|
| 10640 | 5/1980 | European Pat. Off. | 29/568 |
| 3346467 | 7/1985 | Fed. Rep. of Germany | 29/568 |
| 48883 | 4/1977 | Japan | 29/568 |
| 99541 | 6/1985 | Japan | 29/568 |
| 79933 | 4/1987 | Japan | 29/568 |
| 140997 | 4/1980 | Sweden | 29/568 |
| 258580 | 7/1988 | Sweden | 29/568 |
| 636066 | 12/1978 | U.S.S.R. | 29/568 |
| 865601 | 9/1981 | U.S.S.R. | 29/568 |

Primary Examiner—Larry I. Schwartz
Assistant Examiner—R. L. Schultz
Attorney, Agent, or Firm—Spensley Horn Jubas & Lubitz

[57] ABSTRACT

In the punch press of the present invention, a head portion to which are loaded punch and die (tools), a tool receiving portion for receiving a plurality of tools therein, and a tool changer disposed therebetween to effect the delivery of tools, are provided integrally, and the tool receiving portion is formed around a throat so as to be rotatable in a direction in which it intersects the axis of the throat, the throat functioning to support upper and lower frames.

11 Claims, 5 Drawing Sheets

PUNCH PRESS

FIELD OF THE INVENTION

The present invention relates to a punch press and more particularly to an equipment wherein a head portion, a tool receiving portion and a tool changer are provided integrally in a small space.

RELATED ART STATEMENT

In general, a punch press is a machine tool for sheet metal working which performs, for example, punching and forming for steel plates, etc. It has a punch tool (hereinafter referred to simply as "punch") for punching and a die tool (simply "die" hereinafter) serving as a pad for the punch.

As such punch press there has heretofore been used a turret type punch press for improving the working efficiency. In a turret type punch press, plural kinds of punches and dies are arranged on a turret which is disk-shaped for example and they are moved to working positions successively according to a preset working process, then connected to a driving unit through suitable means to effect such workings. According to such turret type punch press, various kinds of workings can be done in a short time by a single machine tool.

Recently there has been a demand for FMS (flexible manufacturing system), namely, an automatic, efficient, multi-variety, small lot production. It is becoming impossible for the conventional turret type punch press to cope with the variety of products desired The demand for the said FMS may be satisfied by an equipment wherein various kinds of tools can be loaded and unloaded automatically with respect to a fixed head portion, not using plural kinds of fixed tools as in the conventional turret type Such equipment may be constructed so that a robot or the like is used to change tools with respect to a fixed head portion of a punch press for example. However, spaces for the robot and for a tool receiving portion are needed in addition to the space of the punch press itself, resulting in that a wide space must be ensured as a whole.

OBJECT AND SUMMARY OF THE INVENTION

It is an object of the present invention to provide a punch press capable of stably receiving therein a large number of tools which cannot be received in a turret alone, and also capable of loading and unloading various kinds of tools with respect to a fixed head portion without occupying a wide space.

In a punch press, in general, a predetermined space to permit the insertion of a work therein is formed between an upper frame to which are loaded punches, etc. and a lower frame to which are loaded dies, etc. To permit this space, the upper and lower frames are connected by a throat portion located at the rear of the equipment. The throat portion in the conventional equipment incorporates devices such as a numerical controller, but the greater part thereof is not utilized to incorporate any devices and therefor represents a type of unused or a dead space. Therefore, if the throat portion which has been a dead space in the conventional equipment is utilized effectively, the size of the equipment may be reduced.

In view of the above point, in the punch press of the present invention, a head portion to which are loaded punch and die (tools), a tool receiving portion for receiving a plurality of tools therein, and a tool changer disposed therebetween to effect the delivery of tools, are provided integrally, and the said tool receiving portion is formed around a throat so as to be rotatable in a direction in which it intersects the axis of the throat, the throat functioning to connect upper and lower frames.

Since in the present invention the tool receiving portion is disposed around the throat which has been a dead space in the conventional equipment and the tool changer is disposed between the head portion which is fixed and the tool receiving portion, a larger number of tools can be received in the machine itself than in the convention turret type; the entire space can be made about the same as in the conventional equipment; besides, the large number of tools can be received in the tool receiving portion in a stable state because they are arranged in the horizontal direction intersecting the axis of the throat.

DETAILED DESCRIPTION OF PREFERRED EMBODIMENTS

Embodiments of the present invention will be described hereinunder with reference to the drawings.

Figure 1:
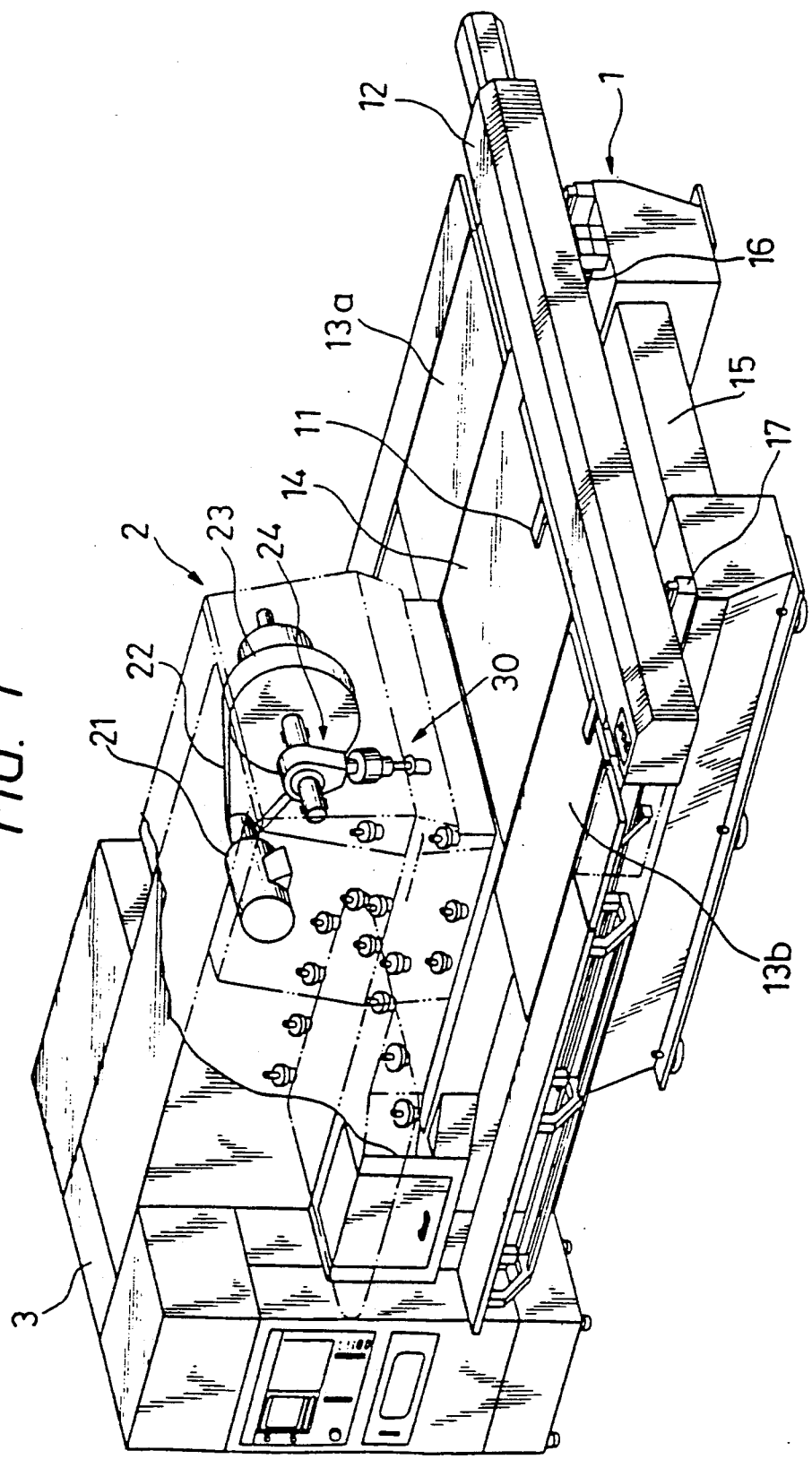
FIG. 1 is an entire construction diagram of a punch press according to an embodiment of the present invention.

FIG. 1 illustrates an entire structure of a punch press according to an embodiment of the present invention. This punch press is composed principally of a lower frame 1, an upper frame 2 and a throat portion 3 which supports the upper and lower frames at their rear portions. The lower frame 1 is provided with a carriage 12 to which is slidably attached a work holder 11, right and left movable tables 13a, 13b, and a stationary table 14. The carriage 12 and the right and left movable tables 13a, 13b can be moved in the longitudinal direction along rails 17 by means of a ball screw 16 or the like provided on a base 15 of the lower frame 1. The upper frame 2 is provided with a punch driving motor 21, a fly-wheel 23 which is rotated by the motor 21 through a transfer member 22 such as a belt, and a crank mechanism 24 connected to the fly-wheel 23 through a clutch or the like.

To the front end of the upper frame 2 is mounted a punch head which is driven by the crank mechanism 24, and a head portion 30 is constituted by both the punch head and a die loaded to the lower frame 1 opposely to the punch head.

A tool changer (in FIG. 1 there are shown only punches and dies to be loaded to the tool changer) is provided in the lower and upper frames 1, 2, and behind the tool changer, that is, in the throat portion 3 there is provided a tool receiving portion (tool magazine) which receives therein punches and dies to be fed to the tool changer.

Figure 2:
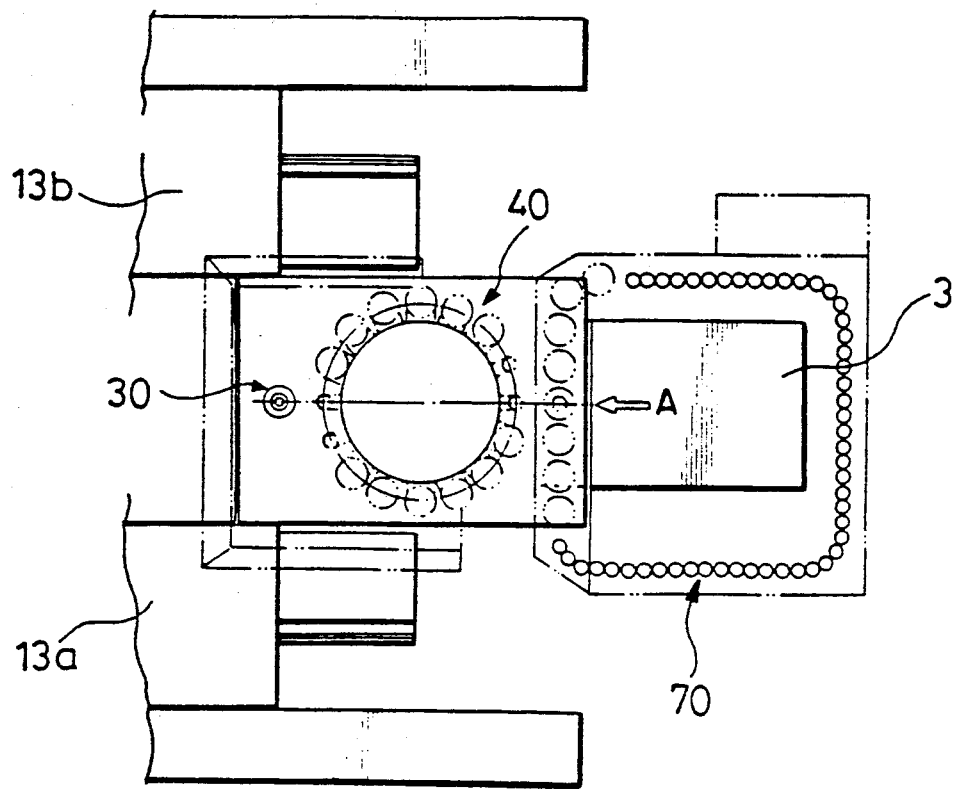
FIG. 2 is a plan view of a portion thereof.
Figure 3:
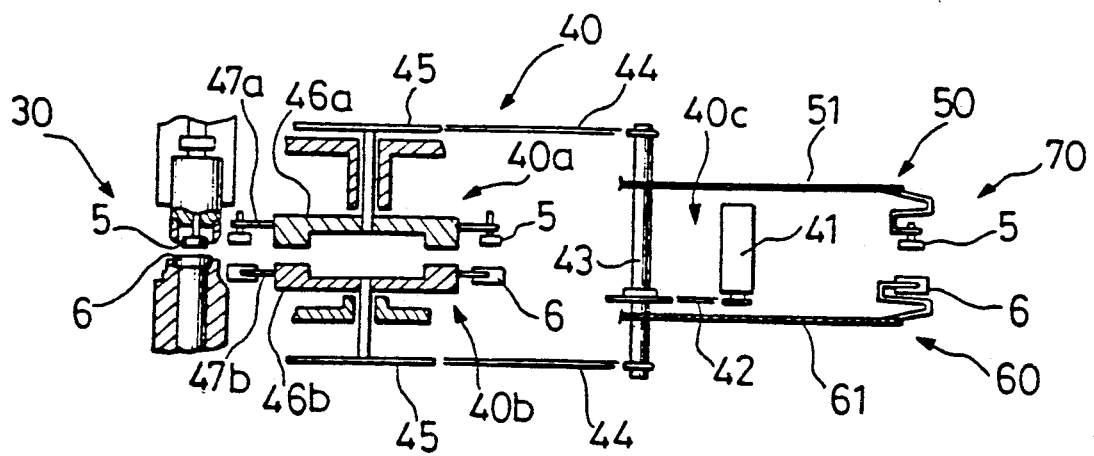
FIG. 3 is a sectional construction diagram for explaining a tool change system used in the punch press.

FIGS. 2 and 3 show the relation of the head portion 30, a tool changer 40 and a tool magazine 70. FIG. 2 is a plan view thereof and FIG. 3 is a sectional side view thereof. As shown in these figures, in the tool changer 40, punches and dies are arranged circularly, while in the tool magazine 70, punches and dies are arranged in a surrounding relation to the throat 3. The tool changer 40 and the tool magazine 70 are rotatable in the horizontal direction with respect to the head portion 30 which is stationary.

As shown in FIG. 3, the tool changer 40 is composed of a punch changing portion 40a provided on the upper frame 2 side, a die changing portion 40b provided on the lower frame 1 side, and a drive mechanism 40c which comprises a motor 41 for driving those punch and die changing portions, a transfer member 42 and a rotary shaft 43. The punch changing portion 40a and the die changing portion 40b are each provided with a pulley 45 which is rotated by the drive mechanism 40c, and disks 46a and 46b are fixed to the pulleys 45, respectively. To the disks 46a and 46b are attached holding mechanisms 47a and 47b respectively for holding punches 5 and dies 6. The holding mechanisms 47a and 47b, which are arranged at predetermined intervals, can each be protruded and retracted in a radial direction of the tool changer 40 by means of a protruding/retracting mechanism (not shown).

Like the tool changer 40, the tool magazine 70 comprises a punch receiving portion 50 provided on the upper frame side and a die receiving portion 60 provided on the lower frame side. The receiving portions 50 and 60 are rotated by transmission means 51 and 61 such as chains.

Figure 4:
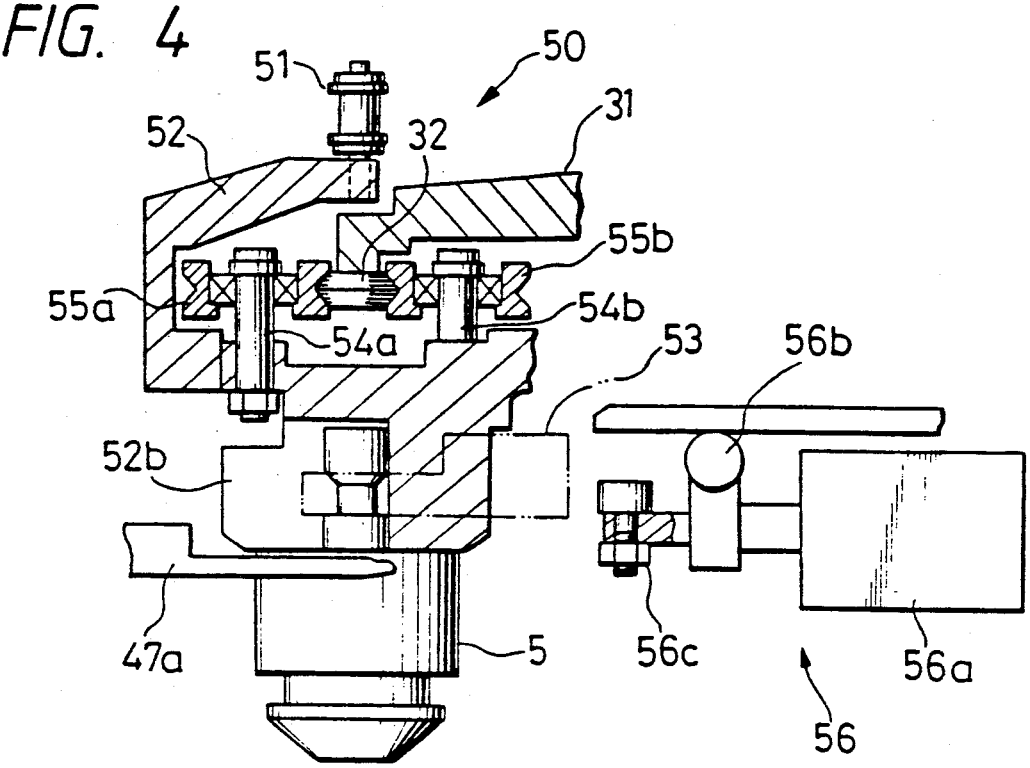
FIG. 4 is a sectional construction diagram showing a punch receiving portion of a tool magazine.
Figure 5:
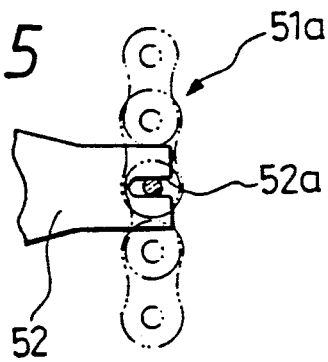
FIGS. 5 and 6 are each a plan view of a portion thereof.
Figure 6:
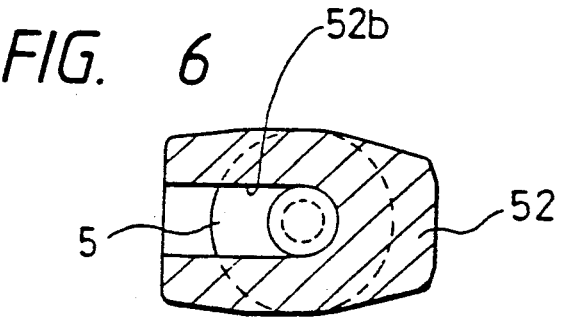

The tool magazine 70 will now be explained in detail. FIG. 4 illustrates a punch receiving portion 50 of the tool magazine 70. In the punch receiving portion 50 there are arranged a large number of holder members 52 at predetermined intervals. Each holder member 52 is for holding the punch in cooperation with a pawl 53 which is attached rotatably to the holder member 52 and its upper end is formed with a cutout 52a as shown in the plan view of FIG. 5. The cutout 52a is engaged with a link pin of the transmission means 51, so that the holder member 52 is rotated and moved. The lower portion of the holder member 52 is formed with a holding slot 52b as shown in FIG. 6 and the head portion of the punch 5 is fitted in the holding slot 52b and gripped by the pawl 53. As shown in detail in FIG. 7, the pawl 53 is constructed so as to grip a smaller diameter portion of the head of the punch 5 continually using a spring or the like (not shown). Further, two roller pins 54a and 54b are implanted centrally in each holding member 52 and rollers 55a and 55b are mounted on the roller pins 54a and 54b rotatably through bearings. The rollers 55a and 55b are centrally formed with grooves, which are engaged with a guide 32 provided at an end of a rail 31 projecting from the throat 3.

Figure 8:
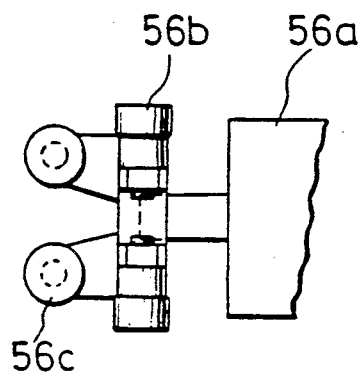
FIG. 8 is a view showing a grip releaser.

Also shown in FIG. 4 is a grip releaser 56 for releasing the grip of the pawl 53 for holding the punch 5. As shown in FIGS. 4 and 8, the grip releaser 56 has a cylinder 56a, a guide roller 56b fixed to the front end of the rod of the cylinder 56a, and a pawl pressing member 56c for releasing the grip of the pawl 53.

Figure 10:
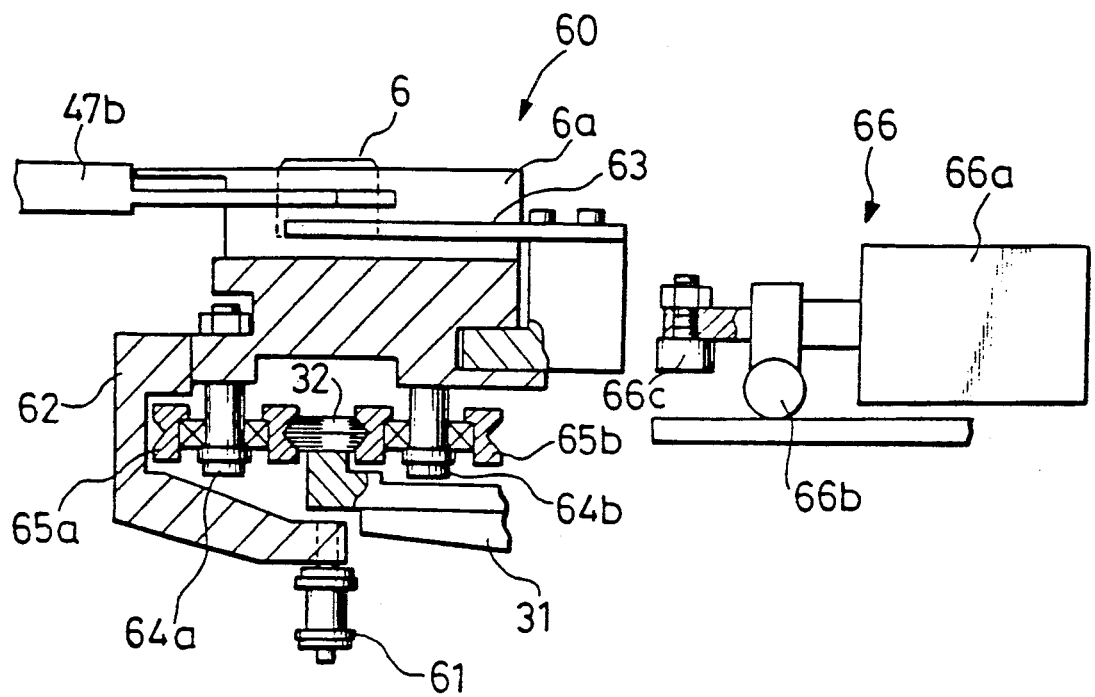
FIG. 10 is a sectional construction diagram showing a die receiving portion of the tool magazine.
Figure 11:
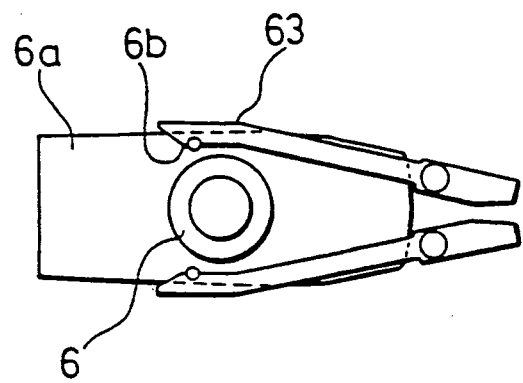
FIG. 11 is a plan view of a portion thereof.

The details of the die receiving portion 60 are shown in FIG. 10. The die receiving portion 60 has a construction which is almost the same as the construction of the punch receiving portion 50. More specifically, holder members 62, which are arranged in a large number at predetermined intervals, each hold the die 6 in cooperation with a pawl 63 attached rotatably to the holder member. The lower end of each holder member 62 is formed with a cutout (not shown), which is engaged with a link pin of the transmission means 61, and rollers 65a and 65b mounted rotatably on roller pins 64a and 64b are engaged with a guide 32 of a rail 31 projecting from the throat 3. In this example, as shown in FIG. 11, the die 6 is of a small diameter and is placed on a die table 6a and the pawl 63 grips pinns 6b of the die table 6a. A grip releaser 66 is just the same in construction as the grip releaser 56 of the punch receiving portion 50 described above, having a cylinder 66a, a guide roller 66b and a pawl urging member 66c.

The operation will be described below. As to the movement of each work, it is the same as in the prior art, so will not be explained here.

To drive punches, the fly-wheel 23 is rotated by the driving motor 21 and at the same time the crank mechanism 24 is rotated through a clutch mechanism, etc. to reciprocate the head vertically.

Next, the change of tools, particularly the delivery of tools between the tool magazine 70 and the tool changer 40, will be mainly explained below.

Punches and dies are stored in pairs in the tool magazine 70 as shown in FIGS. 2 and 3. In the tool magazine 70, the holder members 52 and 62 are engaged with link pins of the transmission means 51 and 61, and the rollers 55a, 55b, 65a and 65b are engaged with the guides 32 at the ends of the rails 31, whereby the holder members 52 and 62 are moved along the rails 31. At this time, the punches and dies are conveyed in pairs so that an erroneous punch-die combination may not be used in tool change.

In changing tools, a desired pair of tools are moved rotationally to a tool change position (indicated by arrow A in FIG. 2) by the transmission means 51 and 61.

Figure 7:
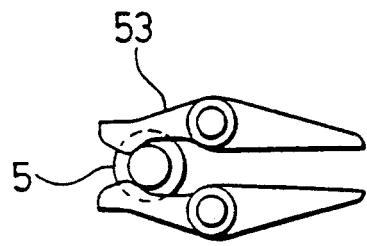
FIG. 7 is a view showing a punch gripping member of the punch receiving portion.
Figure 9:
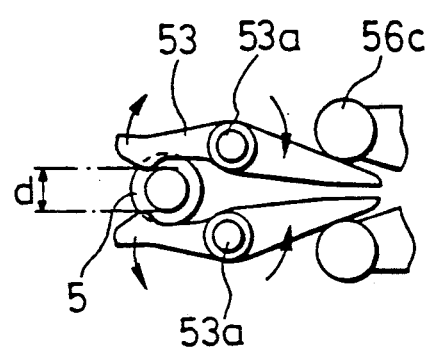
FIG. 9 is a view for explaining the operation thereof.

The delivery operation on the punch side in this tool change position will now be described with reference to FIGS. 4 to 9. First, the pawl of the holding mechanism 47a projects to a predetermined position from the tool changer 40 side and the tip portion thereof comes into engagement with a pin (not shown) formed on the outer periphery of the punch 5. In this state, the cylinder 56a on the tool magazine side operates and the pawl pressing member 56c at the front end thereof projects while being guided by the guide roller 56b, etc. The punch 5 is gripped by the pawl 53 as shown in FIG. 7, but upon projection of the front end of the cylinder 56a mentioned above, the pawl pressing member 56c presses the outside of the rear end of the pawl 53, so that the pawl 53 rotates clockwise about a fixed pin 53a and its tip portion opens against the biasing force of a spring or the like until the tip spacing becomes d (diameter of the grip portion of the punch 5) as shown in FIG. 9, whereupon the holding mechanism 47a on the tool changer side is retracted by the protruding/retracting mechanism, resulting in that the punch 5 is delivered to the tool changer 40 side.

The delivery operation on the die side is also the same. The pawl of the holding mechanism 47b on the tool changer 40 side projects to the tool magazine 70 side and comes into engagement with a pin (not shown) formed outside the die table 6a. Then, the front end of the cylinder 66a projects while being guided by the guide roller 65b, and the pawl pressing member 65c presses the outside of the rear end of the pawl 63, whereby the tip portion of the pawl 63 is opened. Thereafter, the holding mechanism 47b on the tool changer 40 side retracts, whereby the die 6 is delivered together with the table 6a.

In the tool changer 40, the disks 46a and 46b are rotated, say, 180° from the foregoing tool change position as shown in FIG. 2 to move a tool pair to the tool change position for the head portion 30. And the paired tools are delivered to the head portion 30 by the head-side changing mechanism.

The recovery of tools is performed approximately reversely to the above operations.

Thus, in the above embodiment, since the tool magazine 70 is disposed around the throat 3, and together with the tool changer 40 and the head portion, it is rendered integral with the frame, a large number of tools can be received in the machine despite the floor space being approximately the same as in the conventional equipment. And since the plurality of tools are held in a horizontal plane in the tool magazine 70 and the tool changer 40, they can be held stably as compared with, for example, a vertical construction of the tool magazine wherein a plurality of tools are held in a vertical plane.

Further, since the tool magazine 70 is disposed around the throat 3, maintenance can be effected easily from the exterior, for example by forming a peep window in the throat portion.

Figure 12:
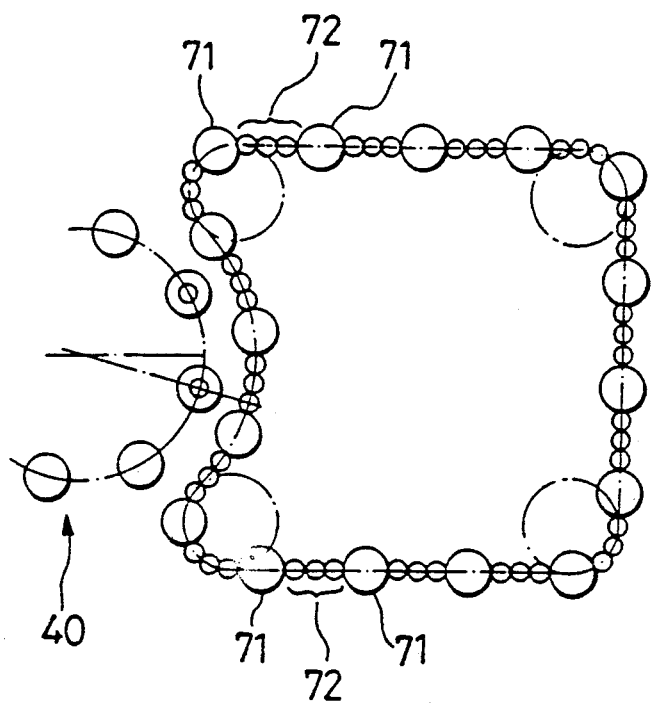
FIG. 12 is a view showing an example of tool arrangement in a tool magazine according to another embodiment of the present invention.

Although in the tool magazine 70 used in the above embodiment the tools are arranged as shown in FIG. 2, there may be adopted such arrangement of tools as shown in FIG. 12, whereby a larger number of tools can be stored.

More particularly, in FIG. 2, large-diameter of tools are arranged continuously, then smaller-diameter of tools are arranged also continuously. In such arrangement, however, many gaps are formed in the portion of the large-diameter tools, which is not desirable from the stand point of tool storing efficiency. In normal operations, small-diameter tools are needed in a larger number as compared with large-diameter tools. Taking note of this point, if tools are arranged as shown in FIG. 12, wherein large-diameter tools 71 are arranged at predetermined intervals and a plurality of smaller-diameter tools 72 are arranged continuously between adjacent such large-diameter tools 71, it is possible to diminish the gaps. In comparison with the arrangement shown in FIG. 2, a larger number of tools can be stored in about the same space.

According to the present invention, as set forth hereinabove, the tool receiving portion is disposed around the throat portion, and the tool receiving portion, the head portion and the tool changer are provided integrally, so a large number of tools can be received in the equipment without requiring a wide floor space. Moreover, since the tool receiving portion is disposed so as to be rotatable in the horizontal direction in which it intersects the throat axis, tools can be stored in a stable state.

What is claimed is:

1. A punch press comprising:
    an upper frame,
    a lower frame,
    a member disposed between and interconnected to the upper frame and the lower frame,
    a head portion configured to receive a punch and a die,
    a tool magazine configured too receive a plurality of punches and dies in a substantially horizontal plane, the punches and dies received in the tool magazine each having an axis arranged in a substantially vertical direction, the tool magazine being rotatably disposed around the member, and
    a tool changer configured too receive a plurality of punches and dies in a substantially horizontal plane, the punches and dies received in the tool changer each having ann axis arranged in a substantially vertical direction, the tool changer being disposed between the head portion and the tool magazine for transferring punches and dies between the head portion and the tool magazine,
    whereby a punch and die are transferred to the head portion with the axes of the punch and the die aligned in a substantially vertical direction.

2. The punch press according to claim 1, wherein the tool changer comprises:
    a punch changing portion associated with the upper frame,
    a die changing portion associated with the lower frame, and
    a drive mechanism for driving the punch changing portion and the die changing portion.

3. A punch press comprising:
    an upper frame,
    a lower frame,
    a member disposed between and interconnected to the upper frame and the lower frame,
    a head portion configured to receive a punch and a die,
    a tool magazine configured to receive a plurality of punches and dies in a substantially horizontal plane, the punches and dies received inn the tool magazine each having an axis arranged in a substantially vertical direction, the tool magazine being rotatably disposed around the member, and
    a tool changer configured to receive a plurality of punches and dies in a substantially horizontal plane, the punches and dies received in the tool changer each having an axis arranged in a substantially vertical direction, the tool changer being disposed between the head portion and the tool magazine for transferring punches and dies between the head portion and the tool magazine,
    whereby a punch and a die are transferred to the head portion with the axes of the punch and the die aligned in a substantially vertical direction
    wherein the tool changer comprises:
    a punch changing portion associated with the upper frame,
    a die changing portion associated with the lower frame, and
    a drive mechanism for driving the punch changing portion and the die changing portion, and
    wherein the punch changing portion comprises:
    a rotatable pulley adapted to be rotated by the drive mechanism,
    a disk fixed to the pulley, and a holding mechanism attached to the disk for holding a punch.

4. The punch press according to claim 1, wherein the tool magazine comprises:
a punch receiving portion associated with the lower frame,
a die receiving portion associated with the upper frame, and
transmission means for rotating the punch receiving portion and the die receiving portion in a substantially horizontal direction with respect to the head portion.

5. A punch press comprising:
an upper frame,
a lower frame,
a member disposed between the upper frame and interconnected to and the lower frame,
a head portion configured too receive a punch and a die,
a tool magazine configured to receive a plurality of punches and dies in a substantially horizontal plane, the puches and dies received in the tool magazine each having an axis arranged in a substantially vertical direction, the tool magazine being rotatably disposed around the member, and
a tool changer configured to receive a plurality of punches and dies in a substantially horizontal plane, the punches and dies received in the tool changer each having an axes arranged in a substantially vertical direction, the tool changer being rotatably disposed around the member, and
a tool changer configured to receive a plurality of punches and dies in a substantially horizontal plane, the punches and dies received in the tool changer each having an axis arranged in a substantially vertical direction, the tool changer being disposed between the head portion and the tool magazine for transferring punches and dies between the head portion and the tool magazine,
whereby a punch and a die are transferred to the head portion with the axes of the punch and the die aligned in a substantially vertical direction.
wherein the tool magazine comprises:
a punch receiving portion associated with the lower frame,
a die receiving portion associated with the upper frame, and
transmission means for rotating the punch receiving portion and the die receiving portion in a substantially horizontal direction with respect to the head portion, and
wherein the punch receiving portion comprises:
a plurality of punch holders arranged around the member, at least one of the plurality of punch holders having a holding slot configured to receive a punch and a pawl rotatably connected to the punch holder for gripping a punch received in the holding slot.

6. The punch press according to claim 5, wherein the punch receiving portion comprises:
a grip releaser for releasing the punch from the grip of the pawl.

7. The punch press according to claim 6, further comprising:
means for establishing a connection between the punch holder and the transmission means, whereby the punch holder is rotated and moved by the transmission means.

8. A punch press comprising:
an upper frame,
a lower frame,
a member disposed between and interconnected to the upper frame and the lower frame,
a head portion configured to receive a punch and a die,
a tool magazine configured to receive a plurality of punches and dies in a substantially horizontal plane, the punches and dies received in the tool magazine each having an axis arranged in a substantially vertical direction, the tool magazine being rotatably disposed around the member, and
a tool changer configured to receive a plurality of punches and dies in a substantially horizontal plane, the punches and dies received in the tool changer each having an axis arranged in a substantially vertical direction, the tool changer being disposed between the head portion and the tool magazine for transferring punches and dies between the head portion and the tool magazine,
whereby a punch and a die are transferred to the head portion with the axes of the punch and the die aligned in a substantially vertical direction.
wherein the tool magazine comprises: a punch receiving portion associated with the lower frame,
a die receiving portion associated with the upper frame, and
transmission means for rotating the punch receiving portion and the die receiving portion in a substantially horizontal direction with respect to the head portion, and
wherein the die receiving portion comprises:
a plurality of die holders arranged around the member, at least one of the die holders having a die table and
a pawl rotatably attached to the die holder for 9. The punch press according to claim 8, wherein the die receiving portion comprises:
a grip releaser for releasing the die from the grip of the pawl.

10. The punch press according to claim 9, further comprising:
means for establishing a connection between the die holder and the transmission means, whereby the die holder is rotated and moved by the transmission means.

11. A punch press comprising:
an upper frame,
a lower frame,
a member disposed between and interconnected to the upper frame and the lower frame,
a head portion configured to receive a punch and a die,
a tool magazine configured to receive a plurality of punches and dies in a substantially horizontal plane, the punches and dies received in the tool magazine each having an axis arranged in a substantially vertical direction, the tool magazine being rotatably disposed around the member, and
a tool changer configured to receive a plurality of punches and dies in a substantially horizontal plane, the punches and dies received in the tool changer each having an axis arranged in a substantially vertical direction, the tool changer being disposed between the head portion and the tool magazine for transferring punches and dies between the head portion and the tool magazine, whereby a punch and a die are transferred to the head portion with the axes of the punch and the die aligned in a substantially vertical direction wherein the tool changer comprises:
a punch changing portion associated with the upper frame,
a die changing portion associated with the lower frame, and
a drive mechanism for driving the punch changing portion and the die changing portion, and
wherein the die changing portion comprises:
a rotatable pulley adapted to be rotated by the drive mechanism,
a disk fixed to the pulley, and
a holding mechanism attached to the disk for holding a die.

* * * * *